No. 627,501. Patented June 27, 1899.
A. W. GRANT.
RUBBER TIRE FOR VEHICLE WHEELS.
(Application filed Feb. 24, 1899.)
(No Model.)

Witnesses
Harry G. Wiseman
Chas. I. Welch

Inventor
Arthur W. Grant
By his Attorney

THE NORRIS PETERS CO., PHOTO-LITHO., WASHINGTON, D. C.

UNITED STATES PATENT OFFICE.

ARTHUR W. GRANT, OF SPRINGFIELD, OHIO, ASSIGNOR TO THE RUBBER TIRE WHEEL COMPANY, OF SAME PLACE.

RUBBER TIRE FOR VEHICLE-WHEELS.

SPECIFICATION forming part of Letters Patent No. 627,501, dated June 27, 1899.

Application filed February 24, 1899. Serial No. 706,713. (No model.)

*To all whom it may concern:*

Be it known that I, ARTHUR W. GRANT, a citizen of the United States, residing at Springfield, in the county of Clark and State of Ohio, have invented certain new and useful Improvements in Rubber Tires for Vehicle-Wheels, of which the following is a specification.

My invention relates to improvements in rubber tires which are especially adapted for ordinary road-vehicles, such as carriages, wagons, &c.

My invention consists of the various constructions and combinations of parts hereinafter described, and set forth in the claims.

Figure 1:
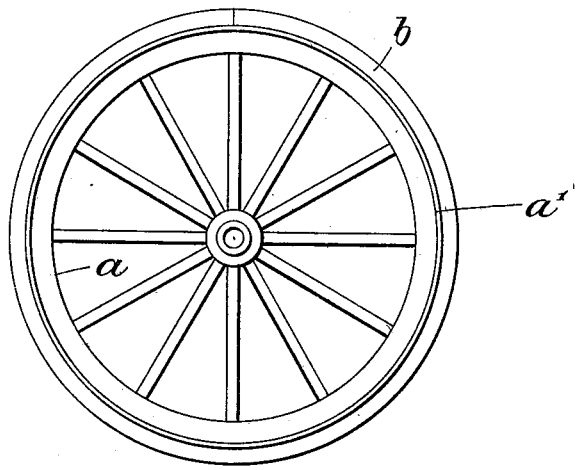
Figure 2:
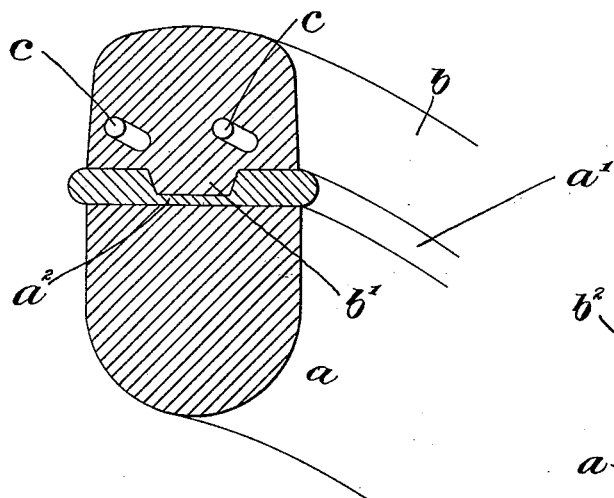
Figure 3:
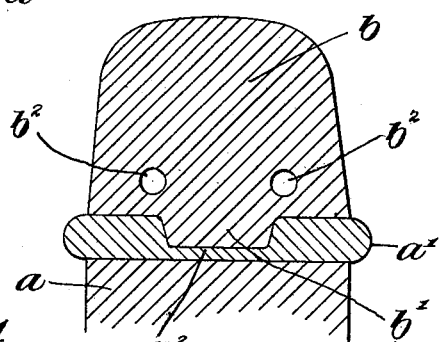
Figure 4:
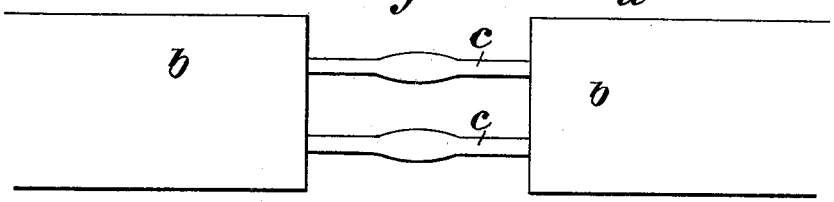

In the accompanying drawings, Figure 1 is a side elevation of an ordinary vehicle-wheel equipped with my improved form of tire. Fig. 2 is a sectional view, partly in perspective, showing the arrangement of the respective parts which make up the rubber tire, in connection with the wheel-felly. Fig. 3 is a partial cross-section of the same with the retaining-wires omitted. Fig. 4 is a plan view showing the ends of the rubber tire drawn back, disclosing the joints in the wires.

It has been found in practice that a successful rubber tire should be attached to the wheel in such a manner that it may have a certain amount of freedom in action. At the same time it should be clamped to the wheel sufficiently tight so that it cannot be removed therefrom. Rubber tires which are attached by rigid connections have been found defective because they do not permit the necessary compensation in the rubber to overcome the violent and sudden shocks which rubber tires on ordinary street-vehicles are subjected to. Practice has further demonstrated that desirable constructions should not only permit a certain amount of freedom in the movement of the tire on the wheel to compensate for undue shocks and strains, but it should be so constructed that the tire will reseat itself after such shock, the construction being such that the tire cannot be forced from the wheel.

In my improved tire I employ on the usual felly $a$ on an ordinary carriage or other wheel a band $a'$ of steel or iron or other suitable material. This band is not unlike the ordinary steel tire used on carriage-wheels. It is preferably rounded on each edge and extends slightly beyond the wood felly $a$. It is made, however, sufficiently thick to receive a channel-groove $a^2$ at or near its center and of a depth equal to about two-thirds the thickness of the band. This channel-groove preferably has tapered sides, and the corners at the top and bottom are slightly rounded to prevent cutting the rubber seated therein and also to permit the necessary movement of the tire therein to compensate for unusual shocks or strains. The rubber tire proper, $b$, is placed on this metal rim or band $a'$ and is formed at the bottom with a tapered projection $b'$ to fit in the tapered slot or channel $a^2$ of that part of the rubber on opposite sides of this projection, being preferably flat, so as to rest on a similar flat or substantially flat surface forming the outer periphery of the metal band $a'$. The side and upper portions of the tire may be of any suitable shape; but the sides are preferably tapered and joined together at the top by curved surfaces, the outer periphery or tread of the tire being shaped more or less acute to suit the different loads or vehicles with which the tire is to be used. This rubber tire $b$ is preferably of a single strip of rubber, but not continuous. It may, however, be formed of one or more strips where wheels of large circumference are employed; but in either event the rubber is perforated throughout its entire length by openings $b^2$, which are located in proximity to the corners formed between the projection $b'$ and the side portions of the bottom of the tire, a sufficient amount of rubber being left between the openings and the corner to prevent the said openings being torn out at the bottom. Through these openings extend retaining-bands $c$ $c$, preferably of wire, the ends of these bands being united together to form continuous independent retaining-bands, as illustrated in Fig. 4. This may be accomplished by welding, brazing, or any other way of uniting the ends of the respective bands. Before being fastened to the wheel the rubber is preferably compressed on the band by making the strip or strips of rubber longer than the periphery of the wheel, so that the elasticity of the rubber tends to close the joint or joints in the same and close up any cuts or incisions which may be made therein in use.

By the constructions above described it will be seen that I produce a rubber tire in which the metallic retaining portions are reduced to the minimum. Nearly the entire depth of rubber is exposed, so that the rubber contacts with projections like street-car tracks and similar obstacles in use, and thus assists materially in mounting said obstacles, being in this respect advantageous over those forms of tires in which the metal-receiving parts are extended some distance along the rubber. By having the downwardly-projecting portion of the rubber fitted into the corresponding groove or channel in the metal band with the retaining-wires in close proximity thereto the rubber is held firmly on the wheel, but not secured rigidly thereto. It is capable of movement in any direction under unusual shocks or strains and is particularly adapted to resist side strains or compensate therefor, the retaining-band on the side on which the strain is received being adapted by reason of the rubber under the same to rise slightly and allow the rubber to yield to compensate for the shock, while the wire on the opposite side being in close proximity to the shoulder on the rubber projection prevents any direct lateral movement of the rubber, which would tend to force it from the metal band. At the same time the constructions are such that when the shock or strain is removed the parts will readily reseat themselves. The projecting tongue $b'$ of the rubber itself may be lifted slightly from its seat on the side from which the shock or strain comes; but by reason of the slightly-tapered sides and the rounded surfaces it will readily reseat itself in the channel when the shock or strain is removed.

Having thus described my invention, I claim—

1. In a carriage-tire the combination with a metal supporting-band having flat or substantially flat surfaces, and a central depression or groove having slightly-tapered sides the rubber band having a tongue or projection shaped to fit into said groove, the bottom of said rubber being formed on each side of said tongue or groove flat or substantially flat to correspond with the flat metallic band, and independent retaining-bands extending through said rubber in proximity to the sides of said tongue or projection, substantially as and for the purpose specified.

2. The combination with a wheel-felly having a metallic band with rounded edges extending over said wheel-felly, a tapered groove formed at or near the center of said band on its outer periphery, a band of rubber having a tongue or projection adapted to fit in said groove, the bottom portion of said rubber on each side of said tongue or projection being flat or substantially so to fit the outer periphery of said metallic band, and independent retaining-bands slightly removed from the bottom portion of said tire but located in proximity to the sides of the tongue or projection, substantially as and for the purpose specified.

3. In a carriage-tire the combination with a metal supporting-band having a central depression or groove with substantially flat surfaces on opposite sides thereof, a tire or band of rubber having its inner periphery formed to fit said metal supporting-band with the flat or substantially flat surfaces on opposite sides of a tongue or projection which fits said groove, independent retaining-wires extending entirely through said rubber in proximity to the sides of said tongue or projection and at a point within the main body of said rubber, said retaining-wires being independent of each other and of the supporting-band, substantially as and for the purpose specified.

In testimony whereof I have hereunto set my hand this 20th day of February, A. D. 1899.

ARTHUR W. GRANT.

Witnesses:
   CHAS. I. WELCH,
   CARL G. WELCH.